B. A. PETERSON.
WINDER.
APPLICATION FILED DEC. 3, 1919.

1,362,636.

Patented Dec. 21, 1920.

Witnesses:
John E. Titus
Earl C. Carlson

Inventor
Burt A. Peterson
By Luther L. Miller
Atty.

UNITED STATES PATENT OFFICE.

BURT A. PETERSON, OF ROCKFORD, ILLINOIS, ASSIGNOR, BY MESNE ASSIGNMENTS, TO BARBER-COLMAN COMPANY, OF ROCKFORD, ILLINOIS, A CORPORATION OF ILLINOIS.

WINDER.

1,362,636.   Specification of Letters Patent.   Patented Dec. 21, 1920.

Application filed December 3, 1919. Serial No. 342,213.

*To all whom it may concern:*

Be it known that I, BURT A. PETERSON, a citizen of the United States, residing at Rockford, in the county of Winnebago and State of Illinois, have invented certain new and useful Improvements in Winders, of which the following is a specification.

This invention relates to winders generally similar to the machine disclosed in Patent No. 1,267,977 dated May 28, 1918. The machine illustrated in said patent is adapted to rewind bobbins to form cross-wound yarn masses or "cheeses." Although the present invention is not limited to any particular kind of yarn mass, the invention will be disclosed in connection with a machine for producing cheeses.

In the machine shown in said patent each cheese is rotatably supported upon an arm or lever. The cheese is rotated to wind yarn thereon through peripheral contact with a rotating drum. When the bobbin is wholly unwound or the thread breaks, the arm is thrown out or swung from one side of its pivot to the other to transfer the cheese from the drum to a position where the traveling winder-tending mechanism may act upon the cheese. This mechanism includes means for finding the end of the yarn on the cheese, and it is desirable that the cheese shall not be rotating when brought into operative relation to the end-finding means. It often happens, however, that the cheese is still rotating through momentum when the winder-tending mechanism reaches it. In the machine disclosed in said patent there is provided a member 258 faced with leather or other suitable friction material, which member is pressed against the end of the tubular core of the cheese. For various reasons, however, the member 258 did not, in practice, always promptly stop rotation of the cheeses. The wear of the friction material upon the member 258 changed the coefficient of friction; the member 258 was in contact with the core only a relatively short time; the member 258 acted relatively close to the center of rotation of the cheese; and there is variation in the sizes of the cheeses and hence in their momentum.

The object of the present invention is to provide improved means for stopping the rotation of the cheese before it is brought into operative relation to the end-finding mechanism.

Figure 1:
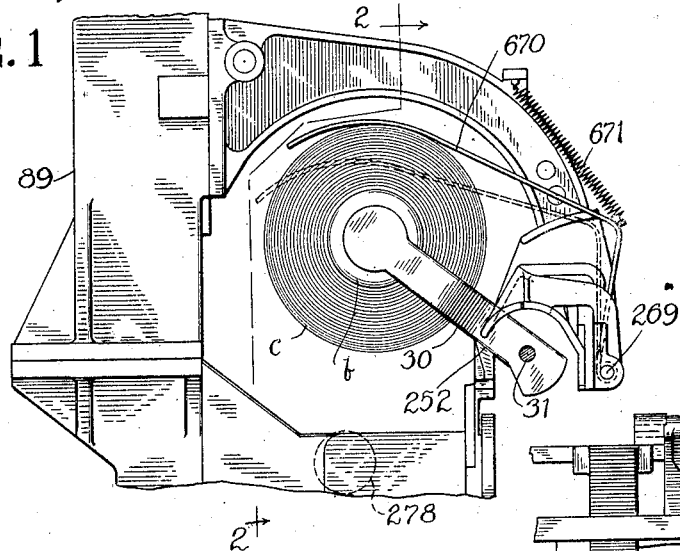
Figure 3:
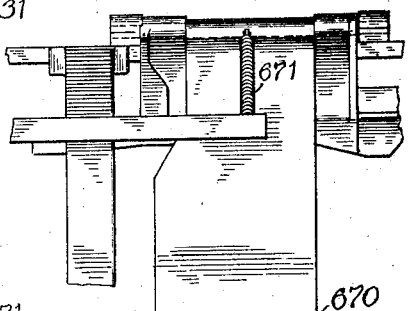
Figure 2:
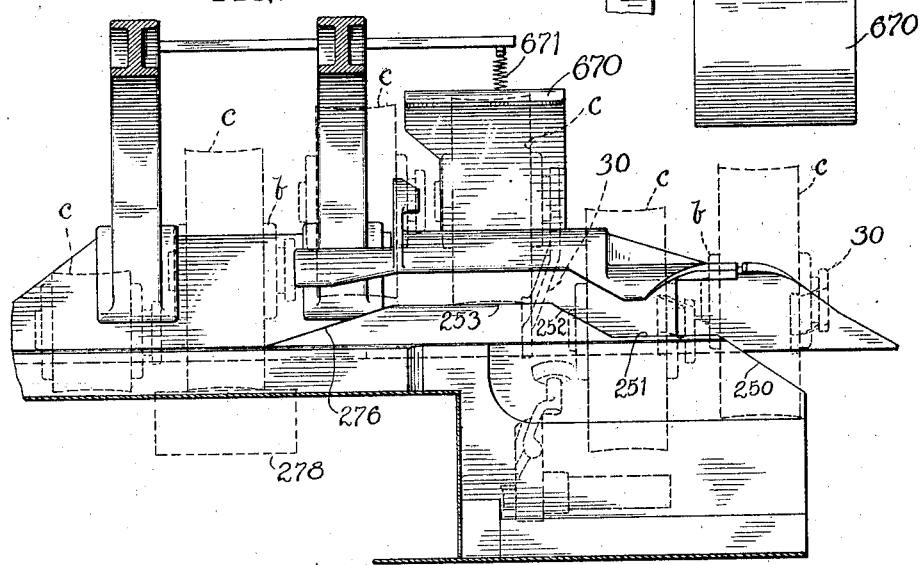

In the accompanying drawings Figure 1 is a fragmental elevation of a winder embodying the features of my invention. Fig. 2 is a vertical sectional view taken approximately in the plane of dotted line 2—2 of Fig. 1. Fig. 3 is a fragmental plan view.

In the drawings, $b$ denotes tubular cores on which yarn is wound to form cheeses $c$. The cores are removably and rotatably supported upon arms 30 pivoted at 31 to the stationary framework of the winder. The winder-tending mechanism comprises a framework or carriage 89 arranged to travel along the winder and operate upon the winding units in succession. Fixed in said framework or carriage is a plow having an inclined surface 250 adapted to lift the thrown-out cheese arms 30 in succession onto a horizontal surface or dwell 251. Rearwardly of the dwell 251 is a rising incline 252 which lifts the cheese arms onto a horizontal surface or dwell 253. Rearwardly of the dwell 253 is a descending incline 276 which allows the cheese arms to descend so as to place the cheeses in succession in operative relation to the end-finding mechanism. The latter may be of any suitable character; herein is shown a roll 278 forming part of an end-finder similar to that disclosed in the before-mentioned patent.

A brake plate 670 is supported on the carriage 89 in position to be engaged by the periphery of a cheese prior to the subjection of the cheese to the action of the end-finding mechanism. In order that the plate 670 shall be adapted to make contact with cheeses of various diameters, said plate is movably supported in a suitable manner, as, for example, by mounting the plate to swing on the axis 269. A contractile spring 671 tends to swing the plate downwardly. The extent to which the plate may swing downwardly is limited through contact of the plate with a portion of the framework. The plate 670 is so located as to overlie a cheese which is being elevated by the incline 252 and is sufficiently wide to remain in contact with the cheese long enough to insure stoppage of rotation. Preferably the plate 670 is curved so as to present a concave surface to the cheese and thus increase the area of contact between the cheese and the plate.

In operation, as the winder-tending mechanism advances, the surfaces 250, 251, 252, 253 and 276 move in succession under the cheese arms. While a given cheese arm is being lifted by the incline 252, or while the dwell 253 is moving under said cheese arm, contact of the cheese and the brake plate 670 is established. The moment at which such contact occurs and the duration of such contact depend upon the size of successive cheeses. If a large cheese follows a small cheese, the large cheese will engage the plate 670 while being raised by the incline 252 and will thus move the plate 670 out of contact with the small cheese. If a small cheese be following a large cheese the plate 670 will not make contact with the small cheese until the plate has passed the large cheese.

It will be seen that the plate 670 may be made of such width and mass and the spring 671 of such strength as to produce sufficient friction to insure stoppage of every cheese, no matter what the diameter of the cheese may be or how recently it may have been thrown out.

The member 670 is preferably of metal. The rubbing of the yarn masses on the plate keeps the plate bright so that the surface condition of the plate remains very nearly constant. The other braking surface is the yarn, and its characteristics are not sufficiently variable to affect seriously the efficiency of the brake.

I claim as my invention:—

1. A winder having, in combination, a yarn mass support, a traveling carriage, end-finding means on the carriage, and a brake member mounted on the carriage in position to be engaged by the periphery of the yarn mass prior to the arrival of the end-finding means at the yarn mass.

2. A winder having, in combination, a yarn mass support, a traveling carriage, end-finding means on the carriage, and a brake plate yieldably mounted on the carriage in position to be engaged by the periphery of the yarn mass prior to the arrival of the end-finding means at the yarn mass.

3. A winder having, in combination, a yarn mass support, a traveling carriage, end-finding means on the carriage, and a brake plate pivoted on the carriage in position to overlie and be engaged by the periphery of the yarn mass prior to the arrival of the end-finding means at the yarn mass.

4. A winder having, in combination, a pivoted arm for supporting a yarn mass, a traveling carriage, end-finding means on the carriage, said carriage having means adapted to pass beneath and engage the arm to position the yarn mass in operative relation to the end-finding means, and a brake member mounted on the carriage in position to overlie and be engaged by the periphery of the yarn mass before said arm-positioning means passes out from beneath the arm.

In testimony whereof I have hereunto set my hand.

BURT A. PETERSON.